United States Patent [19]
Hyde et al.

[11] 3,762,768
[45] Oct. 2, 1973

[54] INFANT CAR SEAT

[75] Inventors: Richard E. Hyde, Palos Verdes Estates; Paul Vogler, Westminster; Dino Morelli, Lynwood; Lee T. Carmichael, Pasadena, all of Calif.

[73] Assignee: "Strolee" of California, a division of U.S. Industries, Inc., New York, N.Y.

[22] Filed: Sept. 13, 1971

[21] Appl. No.: 180,110

[52] U.S. Cl.................. 297/253, 297/255, 297/410, 297/390
[51] Int. Cl................................................ A47d 1/10
[58] Field of Search................... 297/250, 253, 254, 297/255, 256, 390, 410, 418

[56] References Cited
UNITED STATES PATENTS

| | | | |
|---|---|---|---|
| 2,633,906 | 4/1953 | Franz | 297/255 X |
| 2,646,838 | 7/1953 | Welsh | 297/253 |
| 3,215,470 | 11/1965 | Swenson | 297/410 X |
| 2,949,152 | 8/1960 | Hipps | 297/390 X |
| 2,317,894 | 4/1943 | Doty | 297/253 |
| 3,572,827 | 3/1971 | Merelis | 297/253 |

FOREIGN PATENTS OR APPLICATIONS 1,186,808   4/1970   Great Britain .................... 297/253

*Primary Examiner*—Francis K. Zugel
*Attorney*—Lyon & Lyon

[57] ABSTRACT

Described herein are infant car seats supplied with headrests and retentive armrests mutually simultaneously adjustable in height relative to the seat and seat frame of the car seat. Also described are infant's car seats which may be secured to adult seats with adult seatbelts without resort to the hook bars employed in prior art configurations. In a preferred embodiment of the latter configuration, the car seat is provided with a hook bar which can be swung into engagement with the under portion of an adult car seat or, where no space obtains between the adult seat back and adult seat, can be swung clear. By reason of its adjustability, the hook bar may also be employed with adult seating where the back extends below the level of the seat.

7 Claims, 3 Drawing Figures

PATENTED OCT 2 1973

INVENTORS
RICHARD E. HYDE
PAUL VOGLER
DINO MORELLI
LEE T. CARMICHAEL

BY
*Lyon+Lyon*
ATTORNEYS.

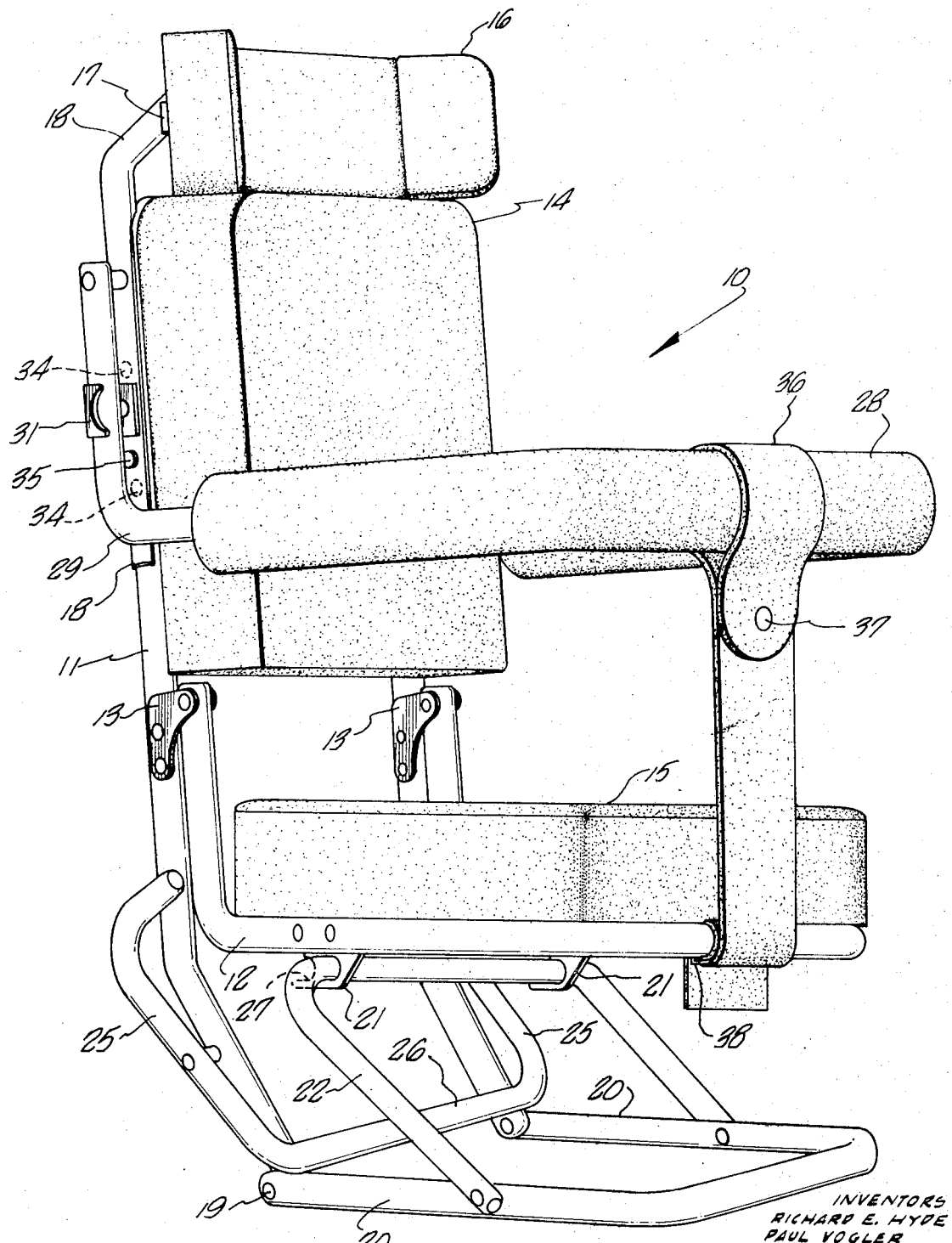

INFANT CAR SEAT

BACKGROUND OF THE INVENTION

1. Field of the Invention

This invention relates to infant car seats, and more particularly to such seats which are adjustable to suit children of varying height and automobiles having varying adult seating configurations.

2. Description of the Prior Art

Car seats for children are, of course, well known but in some degree have heretofore been characterized by a lack of adjustability to suit children of varying height and automobiles whose adult seating is of varying configuration. Thus, for example, in U.S. Pat. No. 3,572,827 to Merelis there is disclosed an infant car seat provided with a headrest mounted on an extension frame apparently suited for adjusting the height of the headrest to correspond with the heights of various children or the increasing height of a given child. In this and other structures representative of the prior art, however, no provision is made for adjustment of the height of the retentive armrest with which such car seats are commonly supplied. A need has accordingly existed for infant car seat configurations which are adjustably sizeable not only with respect to the headrest portions thereof, but also with respect to their retentive armrests. This is so because both customer convenience and manufacturing economies are satisfied best by the production of a single embodiment suited to a variety of employments. In a similar vein, previously available infant car seats have frequently been supplied with hook bar or similar means integrally formed on the legs or base thereof and which, in operation, engage the under portion of the vertical cushion of adult seating to secure the infant seat thereto, e.g., the Merelis patent, supra; U.S. Pat. No. 3,170,727 to Peterson; U.S. Pat. No. 3,103,385 to Grieco; and U.S. Pat. No. 2,739,641 to Singleton. While those configurations have proved advantageous, one disadvantage attending their employment is that the rearwardly extending hook bar or the like precludes their use with adult seating in which the vertical cushion extends below the adult seat cushion or in which no space is provided between the vertical back and seat cushions of adult seating. This is so because in such instances the hook bar forces the infant seat back away from the vertical cushion of the adult seat and accordingly affords a lesser degree of infant support. A need has therefore existed for infant car seating suited to employment with such adult seating and, more preferably, to employment with all types of adult car seating.

BRIEF SUMMARY OF THE INVENTION

According to this invention there is provided infant car seating in which a retentive armrest is made facilely simultaneously adjustable in height with adjustment of the headrest. There is also provided according to the invention infant car seating adapted to be secured to adult seating and to be secured thereon simply by use of adult safety belting, and in a preferred embodiment of the invention such seating is provided with a rotatable hook bar which may be moved into securing engagement with the under portion of adult seat backing when the arrangement of such backing admits of the same, and moved out of engagement with the adult seat back when space for the rearward extension of the hook bar is not provided.

These and other objects and advantages of the invention will become apparent from the detailed description which follows and from the accompanying drawings in which like reference numerals refer to like elements and in which:

FIG. 3 is a second pictorial view of an embodiment of the invention.

DETAILED DESCRIPTION OF THE INVENTION

Figure 1:
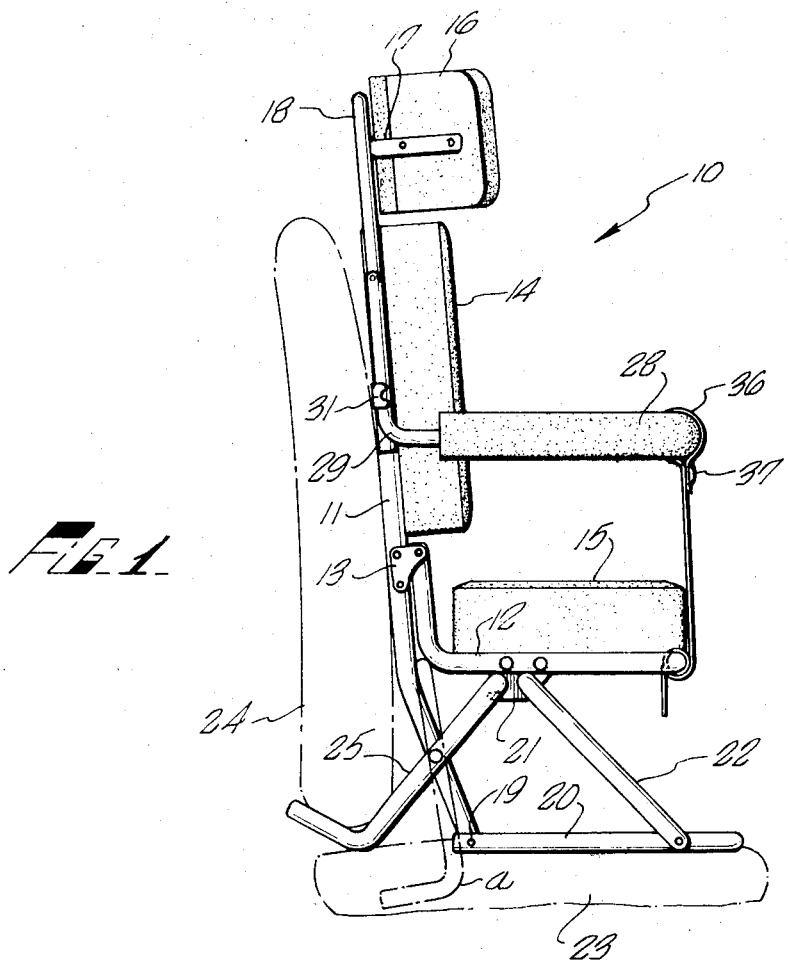
FIG. 1 is an elevation view of a first embodiment of the invention illustrating the manner of its employment with adult seating.

With reference now to the figures, there is illustrated a child's car seat 10 comprised of a back frame 11 and seat frame 12 pivotally mounted on frame 11 by hinge brackets 13. Back and seat cushions 14 and 15 are respectively supported on frames 11 and 12, while headrest 16 is attached by headrest bar 17 to headrest frame 18, which latter is adjustably mounted on frame 11 in a manner hereinafter described. Frame 11 downwardly terminates in a pair of legs respectively pivotally connected at 19 to side supports 20, the side supports being preferably transversely interconnected as illustrated. Seat frame 12 carries on the opposite side portions thereof journal plates 21 in which are journaled seat frame support member 22. Support member 22 is pivotally attached to side supports 20 forward of the connections of supports 20 to back frame 11. Accordingly, it will be seen that there is provided a pivotal subassembly comprised of seat frame 12, side supports 20, and journal plates 21, seat frame 12 of said subassembly carrying side supports 20 pivotally upwardly when seat frame 12 is pivoted upwardly from the illustrated horizontal position about its connection at 13 to back frame 11. Seat frame 12 is stopped against downward pivotal movement past horizontal posi-tion by, inter alia, abutment of the rearward portions thereof against back frame 11. Of course, other stop means could be employed were the arcuate portions of seat frame 12 to lie without the plane of back frame 11, e.g., stop brackets. As will most clearly appear from FIG. 1, it will be seen that seat 10 as described thus far can be employed without hook bars simply by passing the adult safety belt (not shown) supplied with adult seat 23 and adult seat back 24 about the arcuate portions of seat frame 12 and fastening the same. In this case, the truss support afforded by seat frame support member 22 in combination with the stop action of the abutment of the seat frame against back frame 11 provides for rigid and secure engagement of infant seat 10 on the adult seat.

With further reference now to FIGS. 1 and 3, there is preferably provided a hook bar having arcuately terminal side members 25 interconnected by transverse brace member 26, side members 25 being rotatably pivotally mounted on the terminal leg portions of back frame 11 such that, as shown in FIG. 1, the arcuate portions of side members 25 are engageable with the under portion of adult seat back 24, in which position transverse brace member 26 engages locking means carried by the respective side portions of seat frame 12, e.g., the entrant slot 27 provided for that purpose in journal plate 21. It will be understood, of course, that separate locking means may be provided on seat frame 12 between separate journal plates and the pivotal connection of seat frame 12 to back frame 11. Preferably, however, the locking means and journal plate are integrally formed as illustrated.

Occasions will arise where infant seat 10 must needs be employed with adult seating wherein the adult seat back extends below the plane of the horizontal portion of the adult seating. In such instances, transverse brace member 26 is disengaged from brace and journal plate 21 and hook bar side members 25 downwardly rotated in counterclockwise direction to, e.g., position "a" illustrated by phantom lines in FIG. 1. The arcuate portions of hook bar side members 25 are enabled by this positioning to yet engage the lowered under portion of the adult seat back. Alternatively, where no space is provided between the back and horizontal portions of adult seating as in some "bucket" seats, infant car seat 10 may yet be employed simply by pivotal rotation of the hook bar to the position illustrated in FIG. 3, the arcuate portions of side members 25 being sufficiently withdrawn in this instance to yet permit back frame 11 to rest against the adult seat back. In this case, as is indeed recommended for every positioning of the hook bar, adult safety belting is passed around back frame 11 between cushions 14 and 15 and secured to firmly hold car seat 10 against the adult seating.

Figure 2:
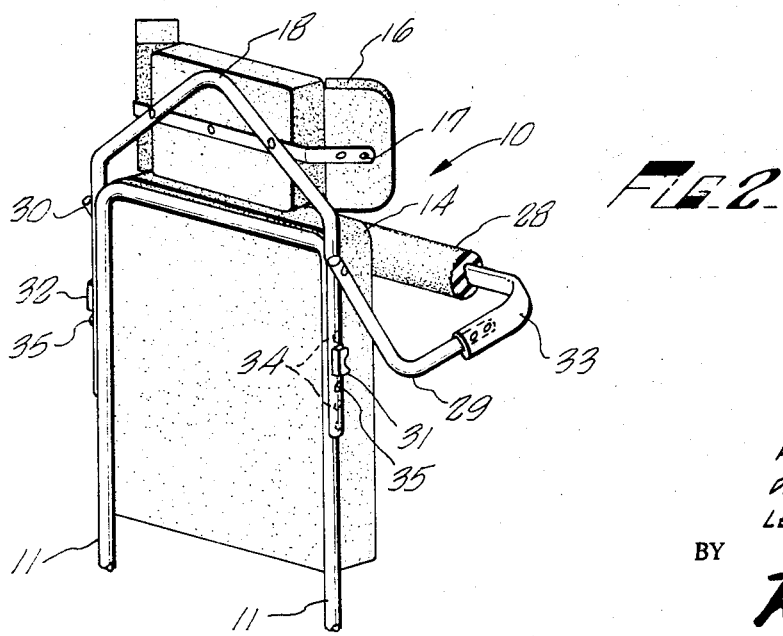
FIG. 2 is a partial pictorial view of an upper portion of an embodiment of the invention.

With particular reference now to FIGS. 1 and 2, car seat 10 is also provided with padded retentive armrest 28 having elbow members 29 and 30 pivotally mounted on headrest frame 18. Stop means such as stop brackets 31 and 32 are provided to prevent downward pivotal movement of armrest 28 past its generally horizontal position. Preferably, as shown in FIG. 2, the padded portion of armrest 28 comprises a non-rigid padding support 33 formed of, e.g., plastic tubing and attached to elbow members 29 and 30 as indicated. Otherwise, it is preferred that all support, frame and hook bar members be formed of metal tubing or the like.

Headrest frame 18 is preferably formed along the respective side portions thereof to nestably receive back frame 11 and is in any case adapted to be vertically adjusted in height relative to back frame 11. Thus, for example, the side portions of back frame 11 may be supplied with a spaced plurality of holes 34 to threadably receive sheet metal screws 35 passed through the side portions of headrest frame 18. Accordingly, vertical adjustment of headrest 16 will work a corresponding adjustment in the height of retentive armrest 28 above seat frame 12.

Car seat 10 is preferably also supplied with an elongate crotch strap 36 affixable at a first end thereof to retentive armrest 28 and at the opposite end thereof to seat frame 12, releasably restraining armrest 28 against pivotal movement relative to seat frame 12 when releasable snap 37 is secured. Means such as wire staple 38 are preferably provided for adjustably affixing crotch strap 36 to seat frame 12, permitting adjustment of the effective length of strap 36 to correspond to the adjustable position of armrest 28 relative to seat frame 12.

It will be seen from the foregoing description that there has been provided by the invention an infant car seat which, while secure in construction, it is markedly versatile from the standpoint of accommodating children of varying physical characteristics and adult seating of varying configurations. Having fully described the preferred embodiments of our invention in the manner prescribed by law, we wish it understood that the invention is not limited thereto but only to the legal scope of the appended claims.

We claim:

1. In a child's carseat which comprises a back frame downwardly terminating in a pair of legs, a seat frame, headrest and retentive armrest, the improvement wherein said headrest is mounted on a headrest frame vertically adjustably mounted on said back frame and wherein said retentive armrest is mounted on said headrest frame whereby vertical adjustment of said headrest works a corresponding adjustment in the height of said retentive armrest above said seat frame.

2. A car seat according to claim 1 which additionally comprises an elongate crotch strap affixable at a first end to said retentive armrest and at the opposite end thereof to said seat frame, said seat having means for adjusting the effective length of said strap to correspond to the variable height of said retentive armrest above said seat frame.

3. A car seat according to claim 2 wherein said strap is passable about said retentive armrest for releasable affixation thereto and wherein said means are mounted on said seat frame.

4. A car seat according to claim 1 wherein said retentive armrest is upwardly pivotally mounted on said headrest frame and wherein stop means engage said retentive armrest when in horizontal position, preventing further pivotal movement toward said seat frame.

5. A child's car seat comprising: side supports at the base thereof, a back frame downwardly terminating in a pair of legs respectively pivotally connected to said side supports, a seat frame having side portions respectively pivotally connected to said legs rearwardly of a journal plate carried by each said side portion, a seat frame support member having an upper portion journaled in each of said plates and lower portions respectively pivotally connected to said side supports forward of the connections of said legs to said side supports, a hook bar having arcuately terminal side members interconnected by a transverse brace member, the respective side members of said hook bar being rotatably pivotally mounted on said legs between said side supports and seat frame, said brace member being engageable with brace plates mounted on the side portions of said seat frame between said journal plates and back frame when said seat frame is in horizontal position, said seat frame being stopped against downward pivotal movement past horizontal position and carrying said side supports pivotally upwardly when pivoted upwardly from horizontal position about its connection to said legs.

6. A child's seat according to claim 1 wherein said brace plates and journal plates are integrally formed.

7. A child's car seat comprising side supports at the base thereof, a back frame downwardly terminating in a pair of legs respectively pivotally connected to said side supports, a seat frame having side portions respectively pivotally connected to said legs, a seat frame support member having an upper portion pivotally connected to the side portions of said seat frame and lower portions respectively pivotally connected to said side supports, a hook bar having arcuately terminal side members interconnected by a transverse brace member, the respective side members of said hook bar being rotatably pivotally mounted on said legs between said side supports and seat frame, said brace member being engageable when said seat frame is in horizontal position with locking means positioned on said seat frame between the pivotal connection of said seat frame support member thereto and said back frame, said seat frame being stopped against downward pivotal movement past horizontal position and carrying said side supports pivotally upwardly when pivoted upwardly from horizontal position about its connection to said legs.

* * * * *